US006291571B1

(12) United States Patent
Fisher

(10) Patent No.: US 6,291,571 B1
(45) Date of Patent: Sep. 18, 2001

(54) LAP EDGE ROOFING SEALANT

(75) Inventor: Dennis Keith Fisher, Brooklyn, MI (US)

(73) Assignee: Adco Products, Inc., Michigan Center, MI (US)

( * ) Notice: Subject to any disclaimer, the term of this patent is extended or adjusted under 35 U.S.C. 154(b) by 0 days.

(21) Appl. No.: 09/531,626

(22) Filed: Mar. 21, 2000

(51) Int. Cl.⁷ .................. C08K 5/01; C08K 5/03; C08L 23/16; C08L 53/02
(52) U.S. Cl. .............. 524/464; 524/474; 524/476; 524/490; 524/499; 524/505; 524/525
(58) Field of Search .................. 524/464, 474, 524/476, 490, 499, 505, 525

(56) References Cited

U.S. PATENT DOCUMENTS

| 4,808,657 | * | 2/1989 | Brown ................... 524/525 |
| 4,849,268 | | 7/1989 | Backenstow et al. ........... 428/57 |
| 5,000,361 | | 3/1991 | Briddell et al. ............. 222/575 |
| 5,084,506 | | 1/1992 | Faler et al. ................ 524/597 |
| 5,234,987 | * | 8/1993 | Hubbard et al. .............. 524/505 |
| 5,242,727 | * | 9/1993 | Briddell et al. ............. 525/240 |
| 5,409,987 | * | 4/1995 | Kalwara et al. .............. 524/519 |
| 5,495,040 | | 2/1996 | Patel et al. ................ 560/190 |
| 5,817,708 | | 10/1998 | Congelio et al. ............. 524/104 |
| 5,849,133 | | 12/1998 | Senderling et al. ........... 156/315 |
| 5,859,114 | * | 1/1999 | Davis et al. ................ 524/490 |
| 5,985,981 | | 11/1999 | Alexander et al. ............ 524/507 |
| 6,048,471 | * | 4/2000 | Henry ....................... 252/364 |

* cited by examiner

Primary Examiner—Peter Szekely
(74) Attorney, Agent, or Firm—Killworth, Gottman, Hagan & Schaeff, L.L.P.

(57) ABSTRACT

A lap edge sealant composition is provided for adhering together overlapping sheets of roofing material which includes a rubbery polymer such as EPDM, a thermoplastic rubber, a tackifier, and a solvent, where the solvent is selected from aliphatic hydrocarbons, para-chlorobenzotrifluoride, or blends thereof. The lap edge sealant has a high solids content of about 65 to 90%, a volatile organic compound (VOC) content of less than about 250 g/l, and exhibits no more than about 35% shrinkage upon curing.

23 Claims, 1 Drawing Sheet

LAP EDGE ROOFING SEALANT

BACKGROUND OF THE INVENTION

This invention relates to a lap edge sealant composition for sealing the lap joints of roofing materials, and more particularly, to a lap edge sealant having a high solids content and a low volatile organic compound (VOC) content.

In the field of single-ply commercial rubber roofing, sheets of roofing material are typically laid on a roof in an overlapping fashion and spliced together to form a continuous sheet which covers the roof. Lap joints are typically used to splice adjacent sheets of roofing material together. The exposed seams of the lap joints are then sealed with an adhesive, typically, a caulking compound, to act as an additional seal to prevent penetration of moisture along the external seam. Currently, solvent-based adhesive sealants are used for sealing the lap joints of adjacent sheets of membrane roofing materials. Such sealants typically utilize aromatic solvents such as benzene, toluene, xylene, etc. However, such solvent-based sealants are environmentally undesirable as they typically contain over 350 grams per liter (3 pounds per gallon) of volatile organic compounds. Because of environmental concerns, many states are beginning to mandate products having no more than 250 grams per liter (2 pounds per gallon) of volatile organic compound (VOC) content.

Another disadvantage of solvent-based sealants currently in use is their low solids content, i.e., about 20 to 30%. As such sealants typically cure by solvent evaporation, high shrinkage (typically about 40–60%) can occur when using these sealants. As a consequence, the cured films may exhibit fissure-type cracking and degradation after long term outdoor exposure.

A number of adhesives have been developed which exhibit lower VOC levels. For example, Congelio et al., U.S. Pat. No. 5,817,708, teach a low VOC content (less than 250 g/l) solvent-based adhesive for use in joining thermoplastic materials. Patel et al., U.S. Pat. No. 5,495,040, also teaches a low VOC (less than 250 g/l) solvent-based adhesive for joining ABS molded articles. However, such adhesives are not specifically formulated for use as lap edge roofing sealants, nor do they have a high solids content.

Backenstow et al., U.S. Pat. No. 4,849,268 teach a 100% solids sealant for providing an internal seal to spliced roofing membranes which is formed from EPDM, butyl or silicone based caulking compositions. The sealant is applied in combination with a splicing cement to the internal portion of the splice. However, Backenstow et al. require that the sealant, splicing cement, and roofing membrane be compatible in order to avoid separation of the sealant from the cement. In addition, Backenstow et al. do not seal the exterior seam on the lap joint.

Accordingly, there is still a need in the art for a lap edge sealant which effectively seals the external lap joints of adjacent sheets of membrane roofing material, which has a high solids content, a low VOC content, and which exhibits low shrinkage upon curing.

SUMMARY OF THE INVENTION

The present invention meets those needs by providing a lap edge sealant composition having a high solids content, a low VOC content of less than 250 g/l, and which exhibits no more than about 35% shrinkage upon curing. By shrinkage, it is meant the decrease in volume of the sealant after curing. The sealant composition provides excellent adhesion to a variety of roofing materials such as EPDM.

In accordance with one aspect of the present invention, a lap edge sealant composition for sealing the lap joints of roofing materials is provided comprising a rubber, a thermoplastic elastomer, a tackifier, and a solvent, where the composition has a solids content of from about 65 to 90% and a VOC content of less than about 250 g/l.

Preferably, the rubber comprises EPDM. The thermoplastic elastomer preferably comprises a styrene-ethylene/propylene copolymer.

Preferably, the rubber comprises EPDM, a styrene-ethylene/propylene copolymer, or both.

The tackifier is preferably selected from the group consisting of aliphatic hydrocarbon resins, polybutene, and combinations thereof.

The solvent is preferably selected from the group consisting of aliphatic hydrocarbons, para-chlorobenzotrifluoride, and blends thereof. The aliphatic hydrocarbons are preferably selected from the group consisting of n-pentane, n-hexane, n-heptane, n-octane, and naphtha. The naphtha may comprise high flash naphtha solvent or VM&P (Varnish Makers and Painters) naphtha. In one preferred embodiment of the invention, the solvent comprises from about 26% by weight para-chlorobenzotrifluoride and from about 74% by weight VM&P naphtha. In another preferred embodiment, the solvent comprises from about1 33% high flash naphtha and 67% VM&P naphtha.

The sealant composition also preferably includes an accelerator/cure package, which preferably comprises a mixture of a sulfur-containing composition and zinc oxide.

In a preferred form, the sealant composition comprises from about 3 to 11% by weight of at least one rubber; from about 1 to 10% by weight of a tackifier; from 30 to 50% by weight of a filler; and from about 5 to 35% by weight of a solvent.

The sealant composition of the present invention may be applied at a job site under a variety of weather conditions to the lap joints of overlapping sheets roofing materials such as EPDM. The sealant composition exhibits low shrinkage upon curing, i.e., less than about 35%.

Accordingly, it is a feature of the present invention to provide a lap edge sealant having a high solids content, a low VOC content, and which exhibits low shrinkage upon curing. Other features and advantages of the invention will he apparent from the following detailed description, the accompanying drawing, and the appended claims.

DETAILED DESCRIPTION OF THE PREFERRED EMBODIMENT

Figure 1:
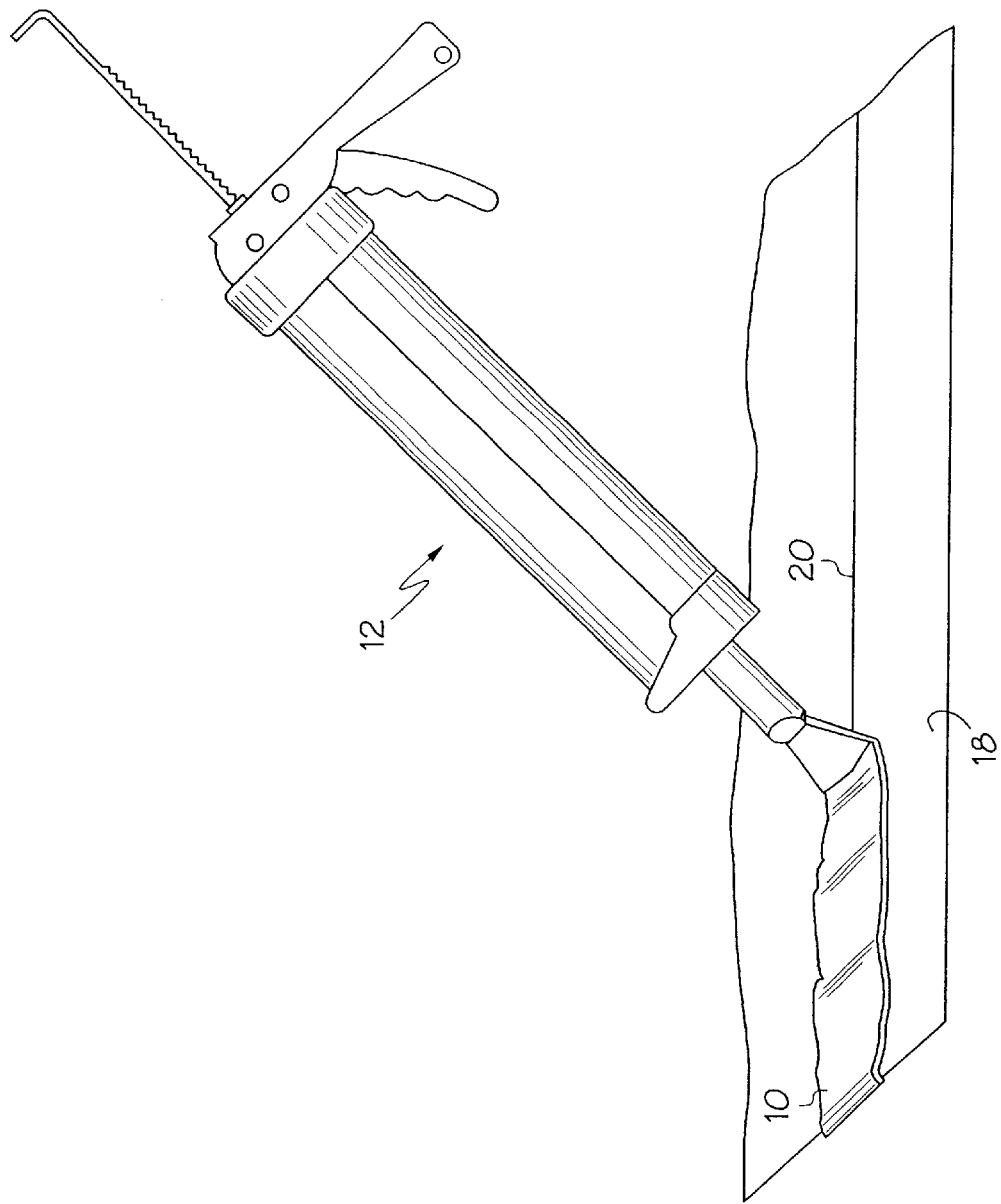
FIG. 1 is a perspective view of the sealant composition of the present invention being applied to seal a lap joint of roofing membranes.

The lap edge sealant of the present invention provides an improvement over currently available lap edge adhesives or sealants in that the VOC content of the composition is less than 250 grams per liter (about 1.7 pounds per gallon) with no more than about 35% shrinkage upon curing, and preferably, less than about 20% shrinkage. The finished cured films are typically 30% thicker than prior art cured films and do not exhibit fissure-type cracking or degradation after long term outdoor field exposure. For example, the typical film thickness in its center portion after application is about 0.20 inches. With typical lap edge sealants, the film thickness will be reduced to as thin as 0.08 inches or less after curing. With the high solids lap edge sealant of the present invention, the film thickness is reduced to only about 0.14 to about 0.16 inches thick.

The lap edge sealant composition of the present invention preferably comprises, as the rubbery polymer component, an othylene-propylene-diene terpolymer (EPDM). A preferred EPDM rubber for use in the present invention is a low Mooney viscosity EPDM terpolymer commercially available from Uniroyal Chemical under the designation Trilene 77. Mooney viscosity is a measure of the viscosity of a rubber as determined by a Mooney shearing disk viscometer. The viscosity is indicated by the torque required to a rotate a disk embedded in a rubber specimen and enclosed in a die cavity under specified conditions. For the EPDM rubbers disclosed herein, a large rotor is used, and the test temperature is 125° C. with a running time of 4 minutes. For typical commercially available EPDM rubbers, the Mooney viscosity is from about 1 to 80. The EPDM rubbers used in the present invention have a low Mooney viscosity of from about 1 to 40, which ensures that the final compounded sealant will have a high solids content with low shrinkage and a low press-flow viscosity for ease of gunnability from a tube, pail or drum.

Other suitable low Mooney viscosity EPDM terpolymers include Trilene 56, 65, 66, and 67 and Royalene LV-1125, LV-1142 and LV-1145, available from Uniroyal Chemical, and Keltan 2506 and 7040, available from DSM Copolymer. Other low Mooney viscosity EPDM terpolymers are Nordel 1320, commercially available from Dupont Dow Elastomer, and TXA-6070, commercially available from DSM Copolymer.

A thermoplastic rubber is also included in the composition to gel the sealant (provide sag resistance) and add cohesive strength. Preferably, the thermoplastic rubber comprises a copolymer of styrene-ethylene/propylene, which is commercially available from a variety of sources. A preferred copolymer for use in the present invention is available from Shell Chemical Company under the designation Kraton G-1701 (which contains 37% styrene). Other suitable thermoplastic rubbers include Kraton G-1702 (28% styrene) and Kraton G-1726 (30% styrene).

The tackifier in the sealant composition preferably comprises an aliphatic hydrocarbon resin, polybutene, or combinations thereof. The tackifier is preferably included to provide the adhesive composition with high initial adhesivity and softness. Preferred aliphatic hydrocarbon resin tackifiers for use in the present invention include Escorez 5300 and 5340, a fully hydrogenated polycyclic hydrocarbon resin available from ExxonMobil Chemical. A preferred polybutene tackifier is Indopol H-300, commercially available from Amoco Chemical. Other suitable polybutene tackifiers include Indopol H-100, H-1500 and H-1900 (available from Amoco Chemical) and Parapol 450, 700, 950, 1300, 2400 and 2500 available from ExxonMobil Chemical.

Suitable fully hydrogenated polycyclic hydrocarbon resins include Escorez 5380 and 5320, available from Exxon Mobil Chemical and Regalrez 1018, 1085, 1094, 1126, 1128, 1139, 3102, 5095 and 6108, available from Hercules. Additional aliphatic hydrocarbon resins include Escorez 1102, 1304 and 1315 available from ExxonMobil Chemical; Eastotac H-100, H-115, H-130 and H-142, available from Eastman Chemical; Wingtack 10 and 95 available from Goodyear Chemical; Adtac LV, Piccopale 100, Piccotac B, 95 and 115, Piccovar AB-180, Regalrez 1018, available from Hercules; and Nevtac 10, 80, 100 and 115, available from Neville Chemical.

The adhesive composition also preferably contains a compatible plasticizer for the rubbery polymer component which imparts softness to the composition. Suitable plasticizing agents include liquid polyisobutylene, for example, Vistanex CP-24, or LM-MH, both of which are commercially available from Exxon Chemical. Other suitable liquid polyisobutylenes include Vistanex LM-S, LM-MS and LM-H, available from ExxonMobil Chemical and Oppanol B-10, B-12 and B-15, available from BASF Corporation.

The composition may also include a an oil such as mineral oil which functions as a low viscosity plasticizer to provide flexibility to the composition at lcw temperatures. A preferred mineral oil is available from Pennzoil Company under the designation Drakeol 10B.

Preferred solvents for use in the present invention include para-chlorobenzotriflouride or aliphatic hydrocarbons such as n-pentane, n-hexane, n-heptane, n-octane and naphtha. High flash naphtha solvent or VM&P (Varnish Makers and Painters) naphtha are the preferred aliphatic hydrocarbons for use in the invention. The aliphatic hydrocarbon solvents are commercially available from a variety of suppliers including Ashland Chemical, ExxonMobil Chemical, Eastman Chemical and Shell Chemical. Para-benzotrifluoride is commercially available from Occidental Chemical Company, Dallas Tex. under the designation Oxsol 100. The solvent preferably comprises either a blend of high flash naphtha solvent (90 solvent) and VM&P naphtha or a blend of para-chlorobenzotrilfuoride and VM&P naphtha.

The sealant composition may optionally include a deodorant mask such as Cherry mask #5236, commercially available from Andrea Aromatics, Princeton, N.J., which masks the odor of the solvent. Other suitable masking agents are Cherry Almond 183–301 and Citrus 173–218, available from Alpine Aromatics International, Inc. (Piscataway, N.J.), #18293 and #18294 available from Atlanta Fragrance (Kennesaw, Ga.), Masking Fragrance AP-970, available from Kraus & Company, Inc. (Oak Park, Mich.) and Fruity 91754, Fruity Vanilla 83576 and Non-Descript 95624 available from Stanley S. Schoenmann, Inc. (Clark, N.J.).

The lap edge sealant composition also includes an accelerator/cure package or system for the rubber polymer component. The present composition may be cured using several wellknown curing systems including sulfur and sulfur-containing systems as well as zinc oxide. Typically, about 0.2 to about 2.0% by weight of the accelerator/cure package in the composition is sufficient. Preferably, the accelerator/cure package comprises a mixture of sulfur, tetramethylthiuram disulfide (TMTD), 2-mercaptobenzothiazyl disulfide (MBTS), butyl zimate, stearic acid, and zinc oxide.

Suitable accelerators for use in the present invention include, but are not limited to, thioureas such as ethylene thiourea, N,N-dibultylthiourea, N,N-diethylthiourea and the like; thiuram monosulfides and disulfides such as tetramethylthiuram monosulfide (TMTMS), tetramethylthiuram disulfide (TMTD), tetraethylthiuram monosulfide (TETMS), dipentamethylenethiruam hexasulfide (DPTH) and the like; benzothiazole sulfenamides such as N-oxydiethylene-2-benzothiazole sulfenamide, N-cyclohexyl-2-benzothiazole sulfenamide, N,N-diisopropyl-2-benzothiazole sulfenamide, N-tert-butyl-2-benzothiazole sulfenamide (TBBS) and the like; 2-mercaptoimidazoline, N-N-diphenylguanidine, N-N-di(2-methyl-phenyl)-guanidine, 2-mercaptobenzothiazole (MBT), 2-mercaptobenzothiazyl disulficle (MBTS), 2-(morpholinodi-thio)benzothiazole disulfide, zinc 2-mercaptobenzothiazole and the like; dithiocarbamates such as tellirium diethyldithiocarbamate, copper dimethyldiothiocarbamate, bismuth dimethyldithiocarbamate, cadmium diethyldithiocarbamate, lead dimethyldithiocarbamate, zinc dibutyldithiocarbamate (butyl zimate), zinc diethyldithiocarbamate and zinc dimethyldithiocarbamate. Typically, the composition includes from about 0.5 to about 2.0% by weight of accelerator.

The cure package may also include a small amount of stearic acid (about 1 to 2 phr) to initiate the vulcanization process. The cure package may further include a surface treated activator (BIK-OT), available from Uniroyal Chemical and a substituted diphenylamine antioxidant (Naugard 445) available from Uniroyal Chemical.

The composition may further include conventional fillers such as carbon black, ground coal, and aluminum silicate. Other suitable fillers include treated fillers such as calcium stearate-treated calcium carbonate, which is available from George Marble Company of Tate, Ga. under the designation CS-11. Oleic acid may also be included as a wetting agent for the fillers. Desiccants such as calcium oxide (lime) may also be included in the composition.

The composition may also include a rheology modifier such as an organoclay and a wax such as a polyethylene wax.

The lap edge sealant composition also preferably includes an antioxidant to stabilize the thermoplastic rubber and the copolymer. While there are many suitable antioxidants, it is preferable to use a phenolic material which is commercially available from The Goodyear Tire & Rubber company under the product name Wingstay L.

The composition is preferably made by mixing all of the components in a medium to high powered mixer, such as a sigma blade or Banbury type mixer. The composition should be vigorously mixed to ensure good dispersion of all the components.

Referring now to FIG. 1, the lap edge sealant composition may be used to seal the lap joints of adjacent sheets of synthetic ribber roofing, materials by applying the composition to at least one overlapping edge of the sheets. To achieve a uniform application, the lap edge sealant is preferably applied with a caulking gun nozzle as described in commonly assigned U.S. Pat. No. 5,000,361, the disclosure of which is incorporated herein by reference. As shown in FIG. 1, the sealant 10 is squeezed from the caulking gun 12 and applied to the overlap seam 20 of roofing material 18.

The sealant composition may be applied in a variety of w eather conditions and becomes fully cured at room temperature (i.e., about 24° C.) after about 21 days. The sealant preferably exhibits a sag of less than about 1½ inches when measured according to ASTM D2202.

In order that the invention may be more readily understood, reference is made to the following example which is intended to illustrate the invention, but not limit the scope thereof.

Example 1

Three sets of lap edge sealants were prepared in accordance with the present invention. The proportions of each component in the sealants designated as 1A, 1B, 1C, 2A, 2B, 2C, and 3A, 3B, and 3C are listed in Tables 1–3 below as parts by weight.

TABLE 1

| Compound | 1A | 1B | 1C |
| --- | --- | --- | --- |
| EPDM[1] | 60 | 60 | 60 |
| styrene-ethylene/propylene copolymer[2] | 48 | 48 | 48 |
| EPDM[3] | 20 | 20 | 20 |
| polyisobutylene[4] | 80 | 80 | 80 |
| polyethylene wax | 30 | 30 | 30 |
| carbon black | 20 | 20 | 20 |
| antioxidant | 2.4 | 2.4 | 2.4 |
| organoclay | 40 | 40 | 40 |
| treated calcium carbonate | 660 | 660 | 660 |
| metallic oxide silica | 20 | 20 | 20 |
| lime | 20 | 20 | 20 |
| tackifier(s) | 88 | 88 | 88 |
| mineral oil | 30 | 30 | 30 |
| para-chlorobenzotrifluoride[5] | 112 | 112 | 112 |
| naphtha | 315 | 310 | 315 |
| n-butyl acetate | — | 6 | — |
| Cherry mask #5236 | — | — | 0.6 |

[1]Nordel 1320 from Dupont Dow Elastomer
[2]Kraton G-1701 from Shell Chemical Company
[3]TXA-6070 from DSM Copolymer
[4]LMMH from Exxon Chemical
[5]Oxsol 100 from Occidental Chemical Company

TABLE 2

| Compound | 2A | 2B | 2C |
| --- | --- | --- | --- |
| EPDM[1] | 70 | 70 | 70 |
| styrene-ethylene/propylene copolymer[2] | 50 | 50 | 50 |
| polyisobutylene[3] | 80 | 80 | 80 |
| polyethylene wax | 30 | 30 | 30 |
| antioxidant | 2 | 2 | 2 |
| carbon black | 20 | 20 | 20 |
| treated calcium carbonate | 750 | 500 | 500 |
| metallic oxide silica | 20 | 20 | 20 |
| aluminum silicate | — | 250 | — |
| tackifier(s) | 95 | 95 | 95 |
| lime | 20 | 20 | 20 |
| oleic acid | 2 | 2 | 2 |
| ground coal | — | — | 250 |
| organoclay | 40 | 40 | 40 |
| mineral oil | 40 | 40 | 40 |
| naphtha | 100 | 100 | 100 |
| VM&P naphtha | 200 | 200 | 200 |

[1]Trilene 77 from Uniroyal
[2]Kraton G-1701 from Shell Chemical Company
[3]Vistanex CP-24 from Exxon Chemical

TABLE 3

| Compound | 3A | 3B | 3C |
| --- | --- | --- | --- |
| EPDM[1] | 70 | 70 | 70 |
| styrene-ethylene/propylene copolymer[2] | 50 | 50 | 50 |
| polyisobutylene[3] | 80 | 80 | 80 |
| polyethylene wax | 30 | 30 | 30 |
| antioxidant | 2 | 2 | 2 |
| carbon black | 20 | 20 | 20 |
| calcium carbonate | 750 | 750 | 750 |
| filler | 20 | 20 | 20 |
| tackifier(s) | 85 | 85 | 85 |
| lime | 20 | 20 | 20 |
| oleic acid | 2 | 2 | 2 |
| organoclay | 30 | 30 | 30 |
| mineral oil | 30 | 30 | 30 |
| Accelerator/cure package | 14 | 12.7 | 6.6 |

TABLE 3-continued

| Compound | 3A | 3B | 3C |
|---|---|---|---|
| naphtha | 71 | 71 | 71 |
| VM&P naphtha | 141 | 141 | 141 |

[1]Trilene 77 from Uniroyal Chemical
[2]Kraton G-1701 from Shell Chemical Company
[3]Vistanex CP-24 from Exxon Chemical All of the above sealants were tested to determine VOC content, solids content, press-flow viscosity, weight per gallon, specific gravity, sag at 25° C. and 70° C., flexibility at −30° C., adhesion to EPDM, and shrinkage. The results are shown below in Table 4. VOC content was determined by ASTM Standard test method D 3960. Solids content was determined by ASTM standard test method C 681. Press-flow viscosity was determined by ASTM standard test method D 2452 (time to extrude 20 grams at 40 psi at 25° C.). The weight per gallon and specific gravity were determined by ASTM standard test method D 1475. Sag at 25° C. and 70° C. were determined by ASTM standard test method D 2202. Flexibility at −30° C. was determined by ASTM standard test method C 711. Adhesion to EPDM was determined by ASTM standard test method C 794. Shrinkage was determined by ASTM standard test method C 733 for volume shrinkage of sealants.

TABLE 4

| Product | VOC Content (g/l) | Solids Content (%) | Press-flow viscosity (seconds) | Weight per gallon (lbs) | specific gravity | Sag @ 25° C. (inches) | Sag @ 70° C. (inches) | Flexibility @ −30° C. | Adhesion to EPDM | Shrinkage |
|---|---|---|---|---|---|---|---|---|---|---|
| 1A | 244 | 69.1 | 18 | 9.83 | 1.18 | 2.14 | 1.73 | Good | Good | 31.4% |
| 1B | 249 | 68.2 | 16 | 9.75 | 1.17 | 3.48 | 3.11 | Good | Good | 32.3% |
| 1C | 247 | 71.3 | 39 | 9.91 | 1.19 | 0.60 | 2.06 | Good | Good | 29.2% |
| 2A | 194 | 86.4 | 61 | 11.93 | 1.43 | 0.44 | 0.55 | Good | Excellent | 14.2% |
| 2B | 211 | 84.8 | 36 | 11.57 | 1.39 | 2.56 | 2.00 | Good | Excellent | 15.8% |
| 2C | 219 | 83.2 | 36 | 10.9 | 1.31 | 0.08 | 0.10 | Good | Excellent | 17.3% |
| 3A | 213 | 83.6 | 34 | 11.84 | 1.42 | 1.02 | 1.03 | Good | Good | 17.1% |
| 3B | 215 | 84.1 | 35 | 11.94 | 1.43 | 1.16 | 0.87 | Good | Good | 16.6% |
| 3C | 213 | 83.6 | 25 | 11.84 | 1.42 | 1.28 | 1.46 | Good | Good | 17.1% |

The sealants were also tested for center and edge cracking using ASTM standard test method C 1257. None of the sealants exhibited center or edge cracking.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. A lap edge sealant composition for sealing the lap joints of roofing materials comprising:
    an EPDM rubber;
    a styrene-ethylene/propylene copolymer;
    a tackifier; and
    a solvent, said composition having a solids content of from about 65 to 90 weight % and a volatile organic compound (VOC) content of less than about 250 g/l.

2. The lap edge sealant of claim 1 further including a plasticizer.

3. The lap edge sealant of claim 1 wherein said tackifier is selected from the group consisting of aliphatic hydrocarbon resins, polybutene, and combinations thereof.

4. The lap edge sealant of claim 1 wherein said solvent is selected from the group consisting of aliphatic hydrocarbons, para-chlorobenzotrifluoride, and blends thereof.

5. The lap edge sealant of claim 4 wherein said aliphatic hydrocarbons are selected from the group consisting of n-pentane, n-hexane, n-heptane, n-octane, and naphtha.

6. The lap edge sealant of claim 5 wherein said solvent comprises naphtha.

7. The lap edge sealant of claim 4 wherein said solvent comprises from about 26% by weight para-chlorobenzotrifluoride and from about 74% by weight naphtha.

8. The lap edge sealant of claim 4 wherein said solvent comprises from about 33% by weight high flash naphtha and from about 67% by weight VM&P naphtha.

9. The lap edge sealant of claim 1 further including an accelerator/cure package.

10. The lap edge sealant of claim 1 wherein said accelerator/cure package comprises a mixture of a sulfur-containing composition and zinc oxide.

11. A lap edge sealant composition for sealing the lap joints of roofing materials comprising:
    from about 3 to 6% by weight of an EPDM rubber;
    from about 1 to 5% by weight of a styrene-ethylene/propylene copolymer;
    from about 1 to 10% by weight of a tackifier;
    from about 30 to 50% by weight of a filler; and
    from about 5 to 35% by weight of a solvent, said composition having a solids content of from about 65 to 90% and a volatile orgailc compound (VOC) content of less than about 250 g/l.

12. The lap edge sealant of claim 11 further including a plasticizer.

13. The lap edge sealant of claim 11 wherein said tackifier is selected from the group consisting of aliphatic hydrocarbon resins and polybutene.

14. The lap edge sealant of claim 11 wherein said solvent is selected from the group consisting of aliphatic hydrocarbons, para-chlorobeizotrifluoride, and blends thereof.

15. The lap edge sealant of claim 14 wherein said aliphatic hydrocarbons are selected from the group consisting of n-pentane, n-hexane, n-heptane, n-octane, and naphtha.

16. The lap edge sealant of claim 14 wherein said solvent comprises naphtha.

17. The lap edge sealant of claim 14 wherein said solvent comprises from about 26% by weight para-chlorobenzotrifluoride and from about 74% by weight naphtha.

18. The lap edge sealant of claim 14 wherein said solvent comprises from about 33% by weight high flash naphtha and from about 67% by weight VM&P naphtha.

19. The lap edge sealant of claim 11 further including an accelerator/cure package.

20. The lap edge sealant of claim 11 wherein said accelerator/cure package comprises a mixture of a sulfur-containing composition and zinc oxide.

21. A lap edge sealant composition comprising:

an EPDM rubber;

a thermoplastic elastomer;

a tackifier; and a solvent comprising from about 26% by weight para-clorobenzotrifluoride and from about 74% by weight naphtha.

22. A lap edge sealant composition comprising:

an EPDM rubber;

a thermoplastic elastomer;

a tackifier; and a solvent comprising from about 33% by weight high flash naphtha and from about 67% by weight VM&P naphtha.

23. A lap edge sealant composition comprising:

an EPDM rubber having a Mooney viscosity of from about 1 to 40;

a thermoplastic elastomer;

a tackifier; and a solvent, said composition having a solids content of from about 65 to 90 weight % and a volatile organic compound (VOC) content of less than about 250 g/l.

* * * * *

UNITED STATES PATENT AND TRADEMARK OFFICE
CERTIFICATE OF CORRECTION

PATENT NO.   : 6,291,571 B1
DATED        : September 18, 2001
INVENTOR(S)  : Dennis K. Fisher It is certified that error appears in the above-identified patent and that said Letters Patent is hereby corrected as shown below:

Column 1,
Line 15, "exposed scams" should be -- exposed seams --

Column 2,
Line 8, "than aboul" should be -- than about --
Line 14, "copolymer, or both." should be -- copolymer. --
Line 34, "In a preferred form, the sealant composition comprises from about 3 to 11% by weight of at least one rubber; from about 1 to 10% by weight of a tackifier; from 30 to 50% by weight of a filler; and from about 5 to 30% by weight of a solvent" should be -- In a preferred form, the sealant composition comprises: a) from about 3 to 6% by weight of a rubber; b) from about 1 to 5% by weight of a thermoplastic elastomer; c) from about 1 to 10% by weight of a tackifier; d) from about 30 to 50% by weight of a filler; and e) from about 5 to 35% by weight of a solvent. --

Column 3,
Line 9, "an othylene" should be -- an ethylene --

Column 4,
Line 15, "lcw temperatures." should be -- low temperatures. --

Column 5,
Line 1, "disulficle (MBTS)" should be -- disulfide (MBTS), --
Line 44, "ribber roofing, materials" should be -- rubber roofing materials --

Column 7,
Line 54, "for scaling the lap" should be -- for sealing the lap --

UNITED STATES PATENT AND TRADEMARK OFFICE
CERTIFICATE OF CORRECTION

PATENT NO. : 6,291,571 B1
DATED : September 18, 2001
INVENTOR(S) : Dennis K. Fisher It is certified that error appears in the above-identified patent and that said Letters Patent is hereby corrected as shown below:

<u>Column 8,</u>
Line 47, "volatile orgailc compound" should be -- volatile organic compound --
Line 55, "para-chlorobeizotrifluoride" should be -- para-chlorobenzotrifluoride --

Signed and Sealed this

Twenty-first Day of May, 2002

Attest:

JAMES E. ROGAN
*Director of the United States Patent and Trademark Office*

*Attesting Officer*